(12) United States Patent
Meijer et al.

(10) Patent No.: US 11,922,746 B2
(45) Date of Patent: Mar. 5, 2024

(54) ACCESS CONTROL SYSTEM

(71) Applicant: NXP B.V., San Jose, CA (US)

(72) Inventors: Rinze Ida Mechtildis Peter Meijer, Herkenbosch (NL); Pramod Rajan Kesavelu Shekar, Bangalore (IN)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 17/809,289

(22) Filed: Jun. 28, 2022

(65) Prior Publication Data

US 2023/0010883 A1    Jan. 12, 2023

(30) Foreign Application Priority Data

Jul. 6, 2021 (EP) ..................................... 21184016

(51) Int. Cl.
*G07C 9/00* (2020.01)

(52) U.S. Cl.
CPC ..... *G07C 9/00563* (2013.01); *G07C 9/00309* (2013.01); *G07C 2009/00317* (2013.01)

(58) Field of Classification Search
CPC ............ G07C 9/00563; G07C 9/00309; G07C 2209/64; B60R 25/2027; B60R 25/25
See application file for complete search history.

(56) References Cited

U.S. PATENT DOCUMENTS

| 7,185,198 | B2 | 2/2007 | Nakamura et al. |
| 10,239,494 | B2 | 3/2019 | Spiess |
| 2006/0056663 | A1 | 3/2006 | McCall |
| 2007/0287386 | A1* | 12/2007 | Agrawal ................ A61B 5/332 455/67.11 |
| 2012/0212322 | A1 | 8/2012 | Idsoe |
| 2015/0163321 | A1 | 6/2015 | Mahmoud et al. |

(Continued)

FOREIGN PATENT DOCUMENTS

| DE | 102019104098 A1 | 8/2020 |
| EP | 3462422 A1 | 4/2019 |

OTHER PUBLICATIONS

Carney, D., "NXP Turns Any Smartphone, Smartwatch Into Car Keys", https://www.designnews.com/gadget-freak/nxp-turns-any-smartphone-smartwatch-car-keys, Apr. 2020.

(Continued)

*Primary Examiner* — Vernal U Brown

(57) ABSTRACT

A method and apparatus of access control as described. A touch of a touch zone of an access controller including a body area network (BAN) transceiver is detected. In response to detecting the touch, a request from an access controller comprising a BAN transceiver via a body area network is transmitted to a user of a portable device including a BAN transceiver and a biometric sensor. The request is received by the portable device via the BAN network. In response to receiving the request, the portable device transmits a digital key comprising biometric data detected by the biometric sensor and a digital identifier from the portable device to the access controller via the BAN network. The user is authenticated by the access controller using the digital key. The access controller controls and actuator to lock or unlock a door in response to the user being authenticated.

10 Claims, 4 Drawing Sheets

(56) References Cited

U.S. PATENT DOCUMENTS

| | | | | |
|---|---|---|---|---|
| 2016/0379472 | A1* | 12/2016 | Schuler | G08B 21/0446 340/539.11 |
| 2017/0151930 | A1 | 6/2017 | Boesen | |
| 2018/0209183 | A1* | 7/2018 | Ham | G07C 9/00 |
| 2019/0039570 | A1 | 2/2019 | Foster et al. | |
| 2020/0045025 | A1* | 2/2020 | Toofan | H04L 63/08 |
| 2021/0084029 | A1* | 3/2021 | Kallugudde | G06Q 20/3821 |
| 2022/0141634 | A1* | 5/2022 | Rajan Kesavelu Shekar | G16H 40/67 455/41.1 |

OTHER PUBLICATIONS

Eisenstein, P., "No car keys? No problem. Hyundai rolls out fingerprint technology that makes keys as outdated as a landline", https://www.cnbc.com/2018/12/26/no-car-keys-no-problem-hyundai-rolls-out-fingerprint-technology.html, Dec. 27, 2018.

Etherington, D., "Your Smart Phone is the Key for the Tesla Model 3", TechCrunch.com/2017/07/28/your-smartphone-is-the-key-for-the-tesla-model-3/, Jul. 2017.

Kim, H., "A Wearable Wrist Band-Type System for Multimodal Biometrics Integrated with Multispectral Skin Photomatrix and Electrocardiogram Sensors", MDPI, Sensors, Aug. 20, 2018.

Lambert, F., "Tesla is rolling out extra layer of security with 'improved cryptography' key fob and optional 'PIN to Drive' feature", Electrek, https://electrek.co/2018/08/29/tesla-new-security-cryptography-pin-to-drive-feature/, Aug. 29, 2018.

Nakamura, T., "In-ear EEG biometrics for feasible and readily collectable real-world person authentication", IEEE Transactions on Information Forensics and Security, vol. 13, Issue 3, Mar. 2018.

Owano, N., "A ring made as identity wearable for opening doors, computer, car", https://techxplore.com/news/2017-06-identity-wearable-doors-car.html, Jun. 29, 2017.

Pelc, M., "ECG Signal as Robust and Reliable Biometric Marker: Datasets and Algorithms Comparison", MDPI, Sensors, May 22, 2019.

Samsung Newsroom, "Samsung and Mercedes-Benz Showcase New Digital Car Key Solution at IFA 2016", https://news.samsung.com/global/samsung-and-mercedes-benz-showcase-new-digital-car-key-solution-at-ifa-2016, Sep. 3, 2016.

Sfeir, J., "What's the Difference Between Bluetooth Low Energy, UWB, and NFC for Keyless Entry?", Electronic Design, https://www.electronicdesign.com/markets/automotive/article/21140598/whats-the-difference-between-bluetooth-low-energy-uwb-and-nfc-for-keyless-entry, Aug. 31, 2020.

Tapkey, "Unlocking Cars via Smartwatch? Sure", https://tapkey.com/blogs/smart-access-control/unlocking-cars-garmin-smartwatch, Jan. 8, 2019.

TechHQ, "UWD—the tech behind Apple and BMW's digital car key", https://techhq.com/2020/07/uwd-the-tech-behind-apple-and-bmws-digital-car-key/, Jul. 2, 2020.

Wu, Y., "Auto-Key: Using Autoencoder to Speed up Gait-based Key Generation in Body Area Networks", ACM Digital Library, https://dl.acm.org/doi/pdf/10.1145/3381004, Article No. 32, pp. 1-23, Mar. 2020.

* cited by examiner

ACCESS CONTROL SYSTEM

CROSS-REFERENCE TO RELATED APPLICATIONS

This application claims the priority under 35 U.S.C. § 119 of European Patent application no. 21184016.0, filed on Jul. 6, 2021, the contents of which are incorporated by reference herein.

FIELD

This disclosure relates to an access control apparatus and method of access control for a system including a portable device having a body area network (BAN) transceiver and an access controller having a BAN transceiver.

BACKGROUND

Building and vehicle access control systems for unlocking and locking doors typically may use key fobs, cards or other access mechanisms. Technological innovations in vehicles may include vehicle access control systems which may provide increased security for example by including biometric information.

SUMMARY

Aspects of the disclosure are defined in the accompanying claims. In a first aspect there is defined a portable device for an access control system, the portable device comprising: a biometric sensor configured to detect biometric signals; a memory configured to store a digital identifier; a BAN transceiver; a control unit coupled to the memory, the biometric sensor and the BAN transceiver; wherein the control unit is configured to: receive a request signal from an access controller via the BAN transceiver in response to a body area network, BAN, of a user of the portable device being formed between the portable device and the access controller; transmit a digital key via the BAN transceiver to the access controller, the digital key comprising a biometric signature of the user determined from the biometric sensor and the digital identifier; and the access controller being configured to authenticate a user access from the digital key and to control an actuator to lock or unlock a door.

In one or more embodiments, the digital identifier may be a vehicle identifier.

In one or more embodiments, the control unit may be configured to transmit a digital key by packetizing the biometric signature data and the digital identifier.

In one or more embodiments, the BAN transceiver may be configured as an NFEMI transceiver.

In one or more embodiments, the portable device may further comprise a power management module coupled to the BAN transceiver, wherein the power management module is configured to trigger a transition from a first operating mode to a second operating mode in response to receiving the request signal and trigger a transition from a first operating mode to a second operating mode after a predetermined time period, wherein the portable device has a lower power consumption in the first operating mode than the second operating mode.

In one or more embodiments, the portable device may further comprise an RF transceiver coupled to the control unit, and a power management module coupled to the RF transceiver, wherein the power management module is configured to trigger a transition from a first operating mode to a second operating mode in response to an RF signal transmitted from the access controller being detected and determining that the portable device is within a predetermined range of the access controller, wherein the portable device has a lower power consumption in the first operating mode than the second operating mode.

In a second aspect there is defined an access controller comprising: a memory configured to store a reference digital identifier and biometric signature; a BAN transceiver; a touch detector coupled to the processing unit; a processing unit coupled to the memory, the BAN transceiver; and configured to be coupled to an actuator wherein the processing unit is configured to: transmit a request signal to a portable device via the BAN transceiver in response to a user contact being detected by the touch detector, the user contact forming a body area network, BAN, between the portable device and the access control device; receive a digital key comprising biometric data and a digital identifier via the BAN transceiver; determine a user access authorization from the digital key; and control the actuator to lock or unlock the door in response to the user being authorized.

In one or more embodiments, the processing unit may be further configured to: determine user access authorization by comparing the received biometric data and digital identifier with the reference biometric data and reference digital identifier.

In one or more embodiments, in response to the user access not being authorized, the processing unit is further configured to re-transmit a request signal to the wearable device.

In one or more embodiments, the BAN transceiver may be configured as a NFEMI transceiver.

In one or more embodiments, the touch detector may comprise a NFEMI antenna coupled to the NFEMI transceiver.

In one or more embodiments, the access controller may further comprise an RF transceiver coupled to the processing unit, wherein the processing unit is configured to transmit a ranging signal via the RF transceiver.

One or more embodiments of the access controller may be included in a vehicle.

One or more embodiments of the access controller and the portable device may be included in an access control system. The access control systems may be configured as one of a vehicle access control system and a building access control system.

In a third aspect there is provided a method of access control comprising: detecting a touch of a touch zone of an access controller further comprising a body area network, BAN, transceiver; in response to detecting the touch, transmitting a request from an access controller comprising a BAN transceiver via a body area network, BAN, of a user of a portable device formed between the access controller and the portable device, the portable device comprising a body area network, BAN, transceiver and a biometric sensor; receiving the request by the portable device via the BAN network; transmitting a digital key comprising biometric data detected by the biometric sensor and a digital identifier from the portable device to the access controller via the BAN network;
  authenticating a user by the access controller from the digital key;
  controlling an actuator to lock or unlock a door in response to the user being authenticated.

In one or more embodiments, the method may further comprise changing the operating mode of the portable device from a first mode to a second mode in response to receiving the request signal, wherein the power consumption of the portable device is lower in the first mode than the second mode.

In one or more embodiments, the method may further comprise re-transmitting a request in response to the user not being authenticated.

Embodiments of the method may be included in method of unlocking a vehicle in response to a user touching the vehicle.

In one or more embodiments, the method may further comprise: determining a door locked status; controlling the actuator to lock the door if the door is unlocked; and controlling the actuator to unlock the door if the door is locked.

In a fourth aspect there is provided a non-transitory computer readable media comprising a computer program comprising computer executable instructions which, when executed by a computer, causes the computer to perform the steps of: detecting a contact of a portable device user with a touch zone of an access controller further comprising a body area network, BAN, transceiver; transmitting a request from the access controller in response to a body area network, BAN, being formed between the access controller and a portable device comprising a body area network, BAN, transceiver and a biometric sensor; receiving the request by the portable device; transmitting a digital key comprising biometric data detected by the biometric sensor and a digital identifier from the portable device to the access controller; authenticating a user from the digital key; controlling an actuator to lock or unlock a door in response to the user being authenticated.

BRIEF DESCRIPTION OF THE DRAWINGS

In the figures and description like reference numerals refer to like features. Embodiments are now described in detail, by way of example only, illustrated by the accompanying drawings in which.

DETAILED DESCRIPTION OF EMBODIMENTS

Figure 1:
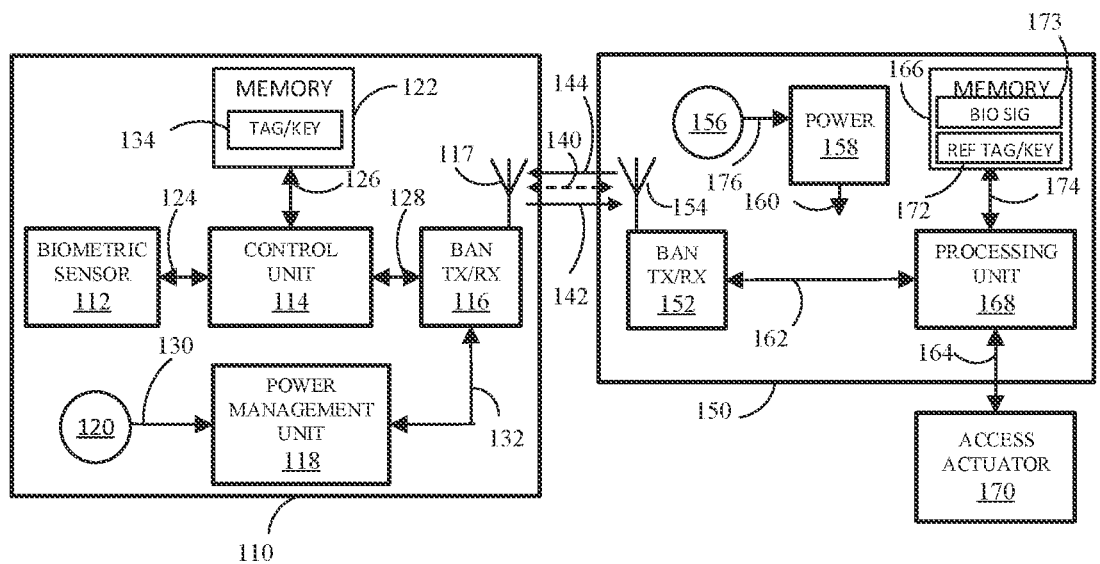
FIG. 1 Shows an access control system including a first and second device each having a BAN transceiver according to an embodiment.

FIG. 1 Shows an access control system 100 including a portable device 110 and an access controller 150 each having a BAN transceiver. The access control system 100 includes an access actuator 170. In some examples the portable device 110 may be included in a wearable device or a key fob that is in contact with a user in operation. In some examples the access controller 150 and the access actuator 170 may be included in a door lock controller. The portable device 110 may be a wearable device such as a hearable, a ring, or a watch or other portable device such as a smartphone or key fob.

The portable device 110 includes a control unit 114 which may be connected by connection 124 to a biometric sensor 112. The control unit 114 may be connected by connection 126 to a memory 122 which may store a tag or key 134. In some examples several tags or keys may be stored. The controller 114 may be connected by connection 128 to a body area network (BAN) transceiver 116 having a BAN antenna 117 In some examples, a power management unit 118 may be included and may have a connection 132 to the BAN transceiver 116. The power management unit 118 may have power connections (not shown) to control the power supplies to the control unit 114, the memory 122 and the biometric sensor 112. A user button 120 may optionally have an output 130 connected to the power management unit 118. The portable device 110 may be implemented in hardware or a combination of hardware and software. In some examples the control unit 114 may be a microprocessor, microcontroller.

The access controller 150 includes a processing unit 168 which may be connected by connection 174 to a memory 166 which may store a reference tag or key 172 and reference biometric signature 173. The processing unit 168 may be connected by connection 162 to a BAN transceiver 152 having a BAN antenna 154. A power supply controller 158 may have power connection 160 to control the power supplied to the second device 150. A touch pad 156 may have an output 176 connected to the power supply controller 158. The processing unit 168 may have an output 164 connected to the access actuator 170 which may for example be a servo motor used to control the locking or unlocking of a door lock. The access controller 150 may be implemented in hardware or a combination of hardware and software. In some examples the processing unit 168 may be a microprocessor, microcontroller.

Examples of body area network (BAN) transceivers 116, 152 include a near field electromagnetic induction (NFEMI) transceiver, transceivers forming a body area network which uses the human body to form a communication path as described in, IEEE 802.15.6 or other transceivers using human body-coupled communication.

In operation, the portable device 110 of the access control system 100 may collect a biometric signature via the biometric sensor to identify the user of the portable device 110. In some examples this biometric signature could be ECG based. In other examples, the biometric signature may be derived from EEG measurement or the gait of a user.

Example methods of gait-based key generation are described in "Auto-Key: Using Autoencoder to Speed Up Gait-based Key Generation in Body Area Networks", Wu et al, Proceedings of the ACM on Interactive, Mobile, Wearable and Ubiquitous technologies, Vol 4, No. 1, March 2020 EISSN 2474-9567.

Example methods of ECG biometric signature generation are described in the following: "A Wearable Wrist Band-Type System for Multimodal Biometrics Integrated with Multispectral Skin Photomatrix and Electrocardiogram Sensors", Kim et al, MDPI Sensors Volume 18, Issue 8, 20 Aug. 2018, https://www.mdpi.com/1424-8220/18/8/2738. "ECG Signal as Robust and Reliable Biometric Marker: Datasets and Algorithms Comparison", Pelc et al, MDPI Sensors, Volume 19, Issue 10, 22 May 2019, https://www.mdpi.com/1424-8220/19/10/2350.

Example methods of pre-processing and EEG classification are described for example in the following: "Biometrics from Brain Electrical Activity: A Machine Learning Approach", Praniiappan and Mandic, IEEE Transactions on pattern analysis and machine intelligence vol 29, No 4, April 2007. "Authentication with brainwaves: a review on the application of EEG as an authentication method", Azizi et al, IEEE 2018 Fourth International Conference on Advances in Computing, Communication & Automation (ICACCA), 26-28 Oct. 2018 Malaysia. "Multi-factor EEG-based User Authentication", Pham et el, 2014 International Joint Conference on Neural Networks, July 2014, Beijing, China. "In-ear EEG biometrics for feasible and readily collectable real-world person authentication" Takashi Nakamura, Valentin Goverdovsky and Danilo P. Mandic, https://arxiv.org/pdf/1705.03742.pdf, 13 Sep. 2017.

The memory 122 contains a tag or key 134 corresponding to a unique identification code for the vehicle, building or part of a building to which access is required.

In response to a BAN communication channel 140 being formed via the body of a user, the access controller 150 may transmit a request 144 to the portable device 110 via the BAN transceiver 152. The portable device 110 may receive the request 144 via the BAN transceiver 116. The power management unit 118 may be triggered by the BAN transceiver to change from a first operating mode to a second operating mode, for example by waking up the control unit 114, biometric sensor 112 and the memory 122 in response to the request 144 being received. The power management unit 118 may provide power for a predetermined amount of time before powering down the portable device 110. In some examples, the user may press button 120 to activate the portable device 110. The controller unit 114 may transmit the biometric signature determined from the biometric sensor and the digital tag or key to the access controller 150 via the BAN transceiver 116. In some examples this may also be considered as an acknowledge 142.

The access controller 150 may receive the acknowledge, and the processing unit 168 may compare the tag or key received with the reference tag or key stored in memory 166 and also the reference biometric signature 173 stored. In some examples multiple biometric signatures and/or reference keys may be stored. If the reference key and biometric signature match, the control unit may control the access actuator to lock or unlock a door. In some examples, the locking or unlocking may be determined from the time duration that the body channel 140 is formed. This corresponds to the duration of time that a user wearing or holding the portable device 110 is in contact with the BAN antenna 154 of the second device 150. In some examples the processing unit 168 may determine the status of the lock (i.e. locked or unlocked) from the access actuator and control the access actuator 170 dependent on the status. For example if the status is unlocked, the processing unit 168 may control the access actuator 170 to lock the door and vice versa.

Figure 2:
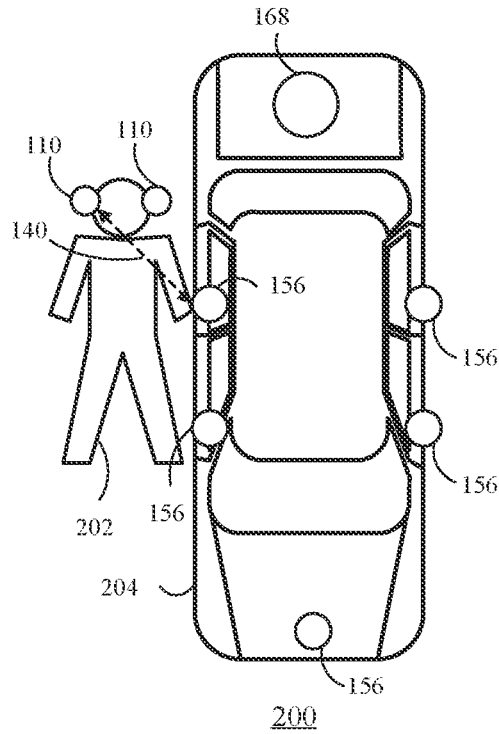
FIG. 2 shows a vehicle access control system according to an embodiment.

FIG. 2 shows a vehicle access control system 200 implemented using access control system 100 according to an embodiment. A user 202 may have a portable device 110 configured as a hearable. A vehicle 204 may include a vehicle access controller implemented similar to access controller 150 including a number of BAN touch zones 156 and a respective BAN transceiver and BAN antenna (not shown). An access actuator (not shown) for controlling each lock may be coupled to the vehicle processing unit 168 and located in each door of the vehicle. A body communication channel 140 may be formed when the user 202 makes contact with a touch zone 156. In other examples an access controller 150 may be used for each touch zone 156 as shown in FIG. 1

Figure 3:
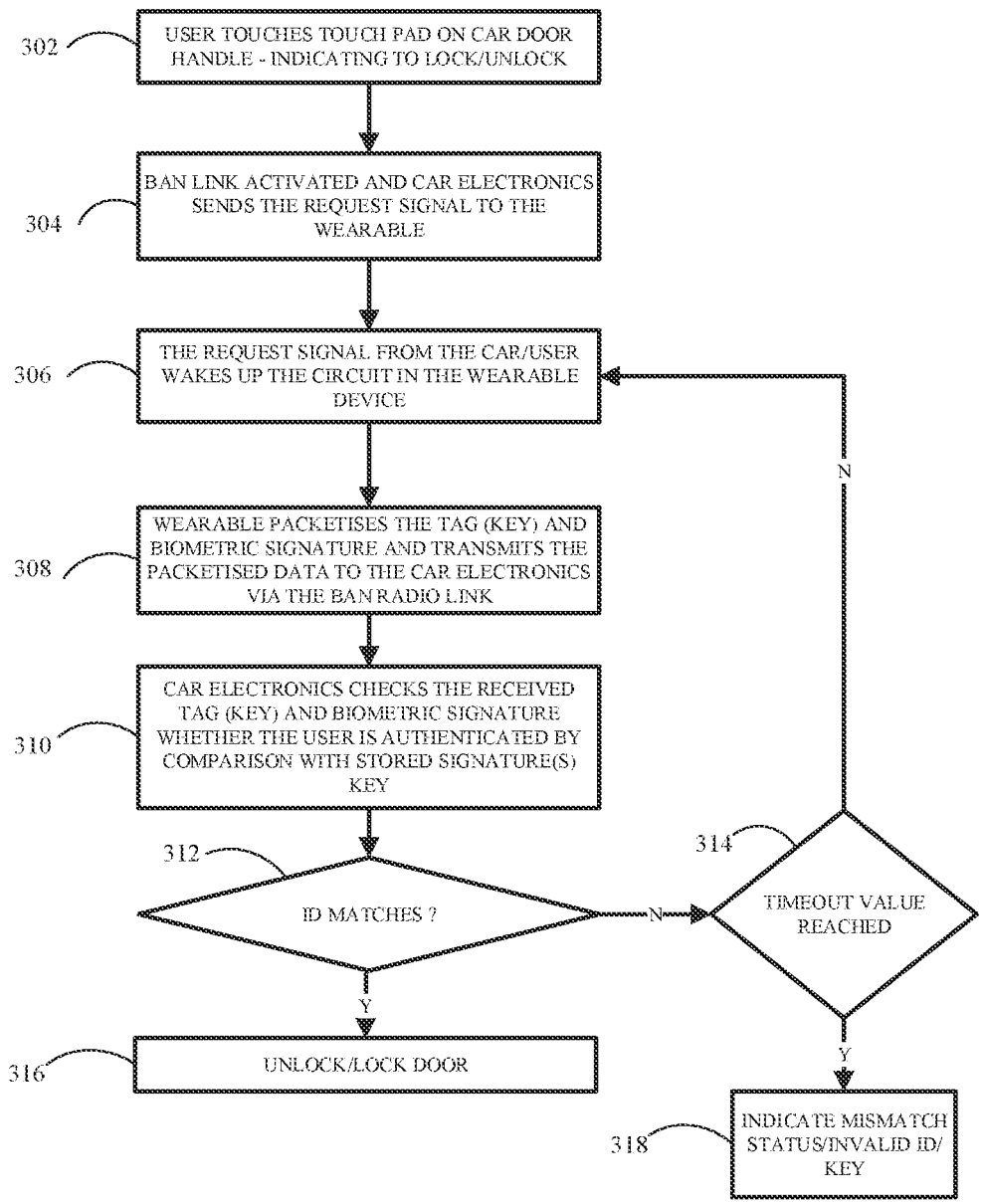
FIG. 3 Shows a method of locking or unlocking a vehicle door according to an embodiment.

FIG. 3 shows a method 300 of locking or unlocking a vehicle door according to an embodiment. The method 300 may be implemented for example by the vehicle access control system 200. In step 302 a user may touch a touchpad or touch zone on a car door handle indicating that the user wishes to lock or unlock the car or other vehicle door. The touchpad may include a BAN antenna such as a NFEMI antenna coupled to a respective BAN transceiver. In step 304, in response to the user touching the touchpad a body area network link may be activated and the vehicle access control may send a request signal to a wearable device worn by the user. In step 306 the request signal received from the vehicle access system may wake up the circuitry in the wearable device. In step 308 the wearable device may packetize a tag and biometric signature which is then transmitted to the vehicle access system via the BAN radio link. In step 310 the vehicle access controller may check the received tag or key and biometric signature. In step 312 the method may determine whether the user is authenticated by comparison with the stored signature keys. If the key and biometric signature match then in step 316 the door may be locked (if unlocked) or unlocked (if locked). Returning to step 312, if the ID does not match then in optional step 314, the method may check whether a timeout value has been reached. If a timeout value has been reached, in step 318, the method may indicate a status mismatch due to one or more of an invalid ID and invalid key. Returning to step 314, if the timeout value has not been reached, the method returns to step 306 and the access controller retransmits the request signal.

Figure 4:
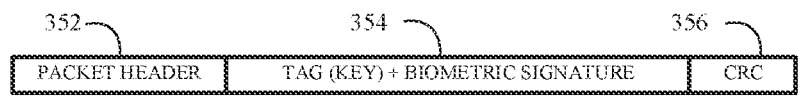
FIG. 4 illustrates an example data packet.

FIG. 4 shows an example of acknowledgement packet structure 350 which may be transmitted by wearable device for example in step 308 of the method 300. The acknowledgement packet structure may include a header field 352, a tag and biometric structure field 354 and a cyclic redundancy check (CRC) field 353.

Figure 5:
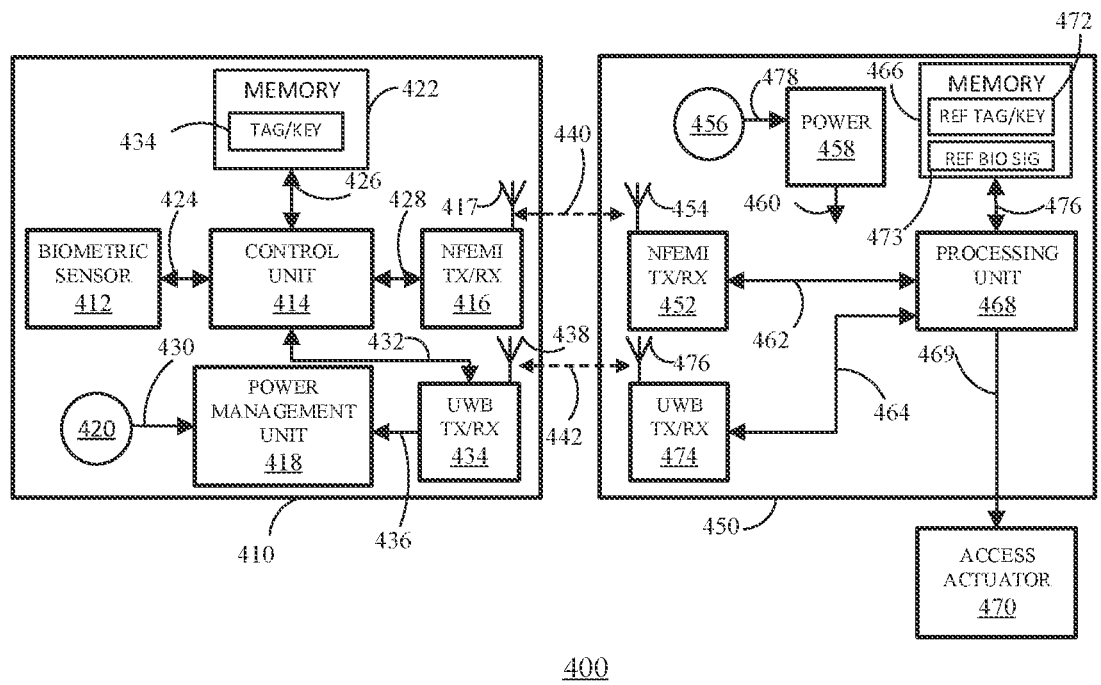
FIG. 5 Shows an access control system including a first and second device each having a NFEMI transceiver and a UWB transceiver according to an embodiment.

FIG. 5 shows an access control system 400 including a portable device 410 and a second device or apparatus 450 each having a NFEMI transceiver and UWB transceiver. The term UWB transceiver as used herein includes transceivers implemented according to IEEE standard 802.15.4. The access control system 400 includes an access actuator 470. In some examples the portable device 410 may be a wearable device or a key fob that is in contact with a user in operation. In some examples the access controller 450 and the access actuator 470 may be included in a door lock controller.

The portable device 410 includes a control unit 414 which may be connected by connection 424 to a biometric sensor 412. The control unit 414 may be connected by connection 426 to a memory 422 which may store a tag or key 434. In some examples several tags or keys may be stored. The controller 414 may be connected by connection 428 to a NFEMI transceiver 416 having a NFEMI antenna 417. The controller 414 may be connected by connection 432 to a UWB transceiver 434 having a UWB antenna 438. The portable device 410 may further include a power management unit 418 having an input connection 436 from the UWB transceiver 434. The power management unit 418 may have power connections (not shown) to control the power supplies to the control unit 414, the memory 422 and the biometric sensor 412. A user button 420 may optionally have an output 430 connected to the power management unit 418. The portable device 410 may be implemented in hardware or a combination of hardware and software. In some examples the control unit 414 may be a microprocessor, microcontroller.

The access controller 450 includes a processing unit 468 which may be connected by connection 476 to a memory 466 which may store a reference tag or key 472 and reference biometric signature 473. The processing unit 468 may be connected by connection 462 to a NFEMI transceiver 452 having a NFEMI antenna 454. The processing unit 468 may be connected by connection 464 to a UWB transceiver 474 having a UWB antenna 476. A power supply controller 458 may have power connection 460 to control the power supplied to the second device 450. A touch pad 456 may have an output 478 connected to the power supply controller 458. In some examples the touch pad 456 may implemented by the NFEMI antenna 454 in which case the touch pad 456 and the NFEMI antenna 454 may be combined. The processing unit 468 may have an output 469 connected to the access actuator 470 which may for example be a servo motor used to control the locking or unlocking of a door lock.

The access controller 450 may be implemented in hardware or a combination of hardware and software. In some examples the processing unit 468 may be a microprocessor, microcontroller. In operation the portable device 410 may receive an initial request via the UWB transceiver via a UWB communication channel 442 when the portable device 410 is within a predetermined range of the UWB transceiver of the access controller. The power management unit 418 may be triggered to wake up the control unit 414, the biometric sensor 412 and the memory 422. In this way the portable device 410 is active before the user of the portable device 410 touches the touch pad 456 of the access controller 450. A body communication channel 440 may be formed when a user holding or wearing the first device touches the access controller 450. In some examples, other BAN transceivers may be used instead of the NFEMI transceivers. In some examples other RF transceivers, for example Bluetooth transceivers, or other RF transceivers which support high-accuracy distance measurement may be used instead of UWB transceivers.

Figure 6:
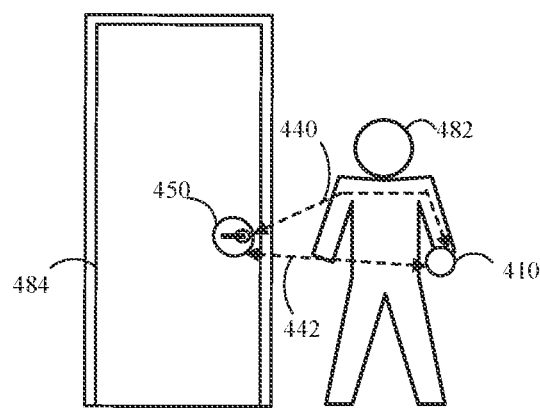
FIG. 6 Illustrates a building access control system implemented using the access control system of FIG. 5.

The access control system 400 may for example be used to implement a building access control system 480 shown in FIG. 6. The user 482 may be wearing or holding the portable device 410. The access controller 450 and actuator 470 (not shown) may be included in the door 484 or be positioned adjacent to the door.

Figure 7:
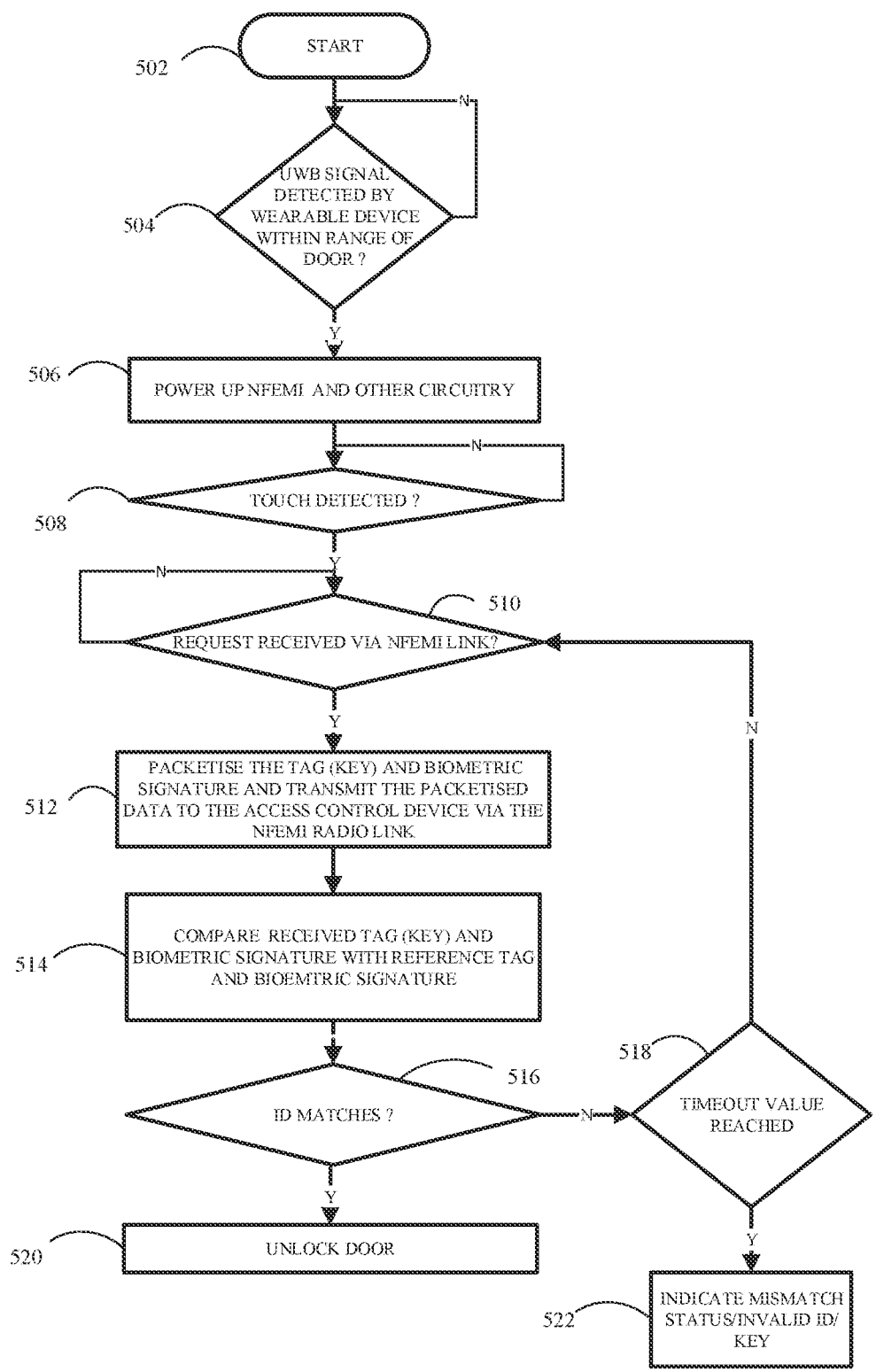
FIG. 7 Shows a method of access control according to an embodiment.

FIG. 7 shows a method of access control 500. The method may for example be implemented by access control systems 400, 480. In step 502, the method starts. In step 504, the method checks whether a UWB signal has been detected for example by first device 410 when within a predetermined range of the access controller 450 which is located near a door. This may be determined initially for example from a received signal strength indication (RSSI) measurement of the received UWB signal. The portable device 410 may then power up the control unit 414 to perform a more accurate range determination by a time of flight measurement of a UWB signal transmitted from the portable device 410 via UWB transceiver. If a UWB signal within range has been detected, the method then proceeds to step 506 and the portable device 410 may power up the NFEMI and other circuitry. In step 508, the method checks whether a touch has been detected, for example by a user wearing or holding the portable device 410 contacting a touch pad or touch zone 456. In some examples, the touch may be detected by monitoring the antenna tuning parameters of the NFEMI antenna 452 in the access controller 450. In these examples the touch pad 456 and NEMI antenna 454 may be combined.

If a touch has been detected, then in step 510, the method may check whether a request has been received via the NFEMI link. If a request has been received then the method proceeds to step 512 where the portable device 410 may packetize a tag and biometric signature which is then transmitted to the access controller via the NFEMI radio link. In step 514 the access controller may check the received tag or key and biometric signature. In step 516 the method may determine whether the user is authenticated by comparison with the stored signature keys. If the key and biometric signature match then in step 520 the door may be locked (if unlocked) or unlocked (if locked). Returning to step 516, if the ID does not match then in optional step 518, the method may check whether a timeout value has been reached. If a timeout value has been reached, in step 522, the method may indicate a status mismatch due to one or more of an invalid ID and invalid key. Returning to step 518, if the timeout value has not been reached, the method returns to step 510 and the access controller may retransmit the request signal.

Embodiments described in the present disclosure may provide a secure keyless vehicle or building access solution that does not require extra user actions for accessing a vehicle or building, thereby improving user convenience. Embodiments of the access control system provide a user-specific biometric signature that is collected by a wearable (body worn) device or device being held by a user at real-time. This biometric signature may be used, in combination with a unique identifier of the vehicle or building access point to provide a digital key which may determine and to authenticate a given person requesting access. By using a human body communication, a more a secure communication channel is provided for authentication purposes which is resistant for example to so-called man-in-the middle attacks. The access controller is initiated when the user is touching a designated zone for example a car door handle.

A method and apparatus of access control as described. A touch of a touch zone of an access controller including a body area network (BAN) transceiver is detected. In response to detecting the touch, a request from an access controller comprising a BAN transceiver via a body area network is transmitted to a user of a portable device including a BAN transceiver and a biometric sensor. The request is received by the portable device via the BAN network. In response to receiving the request, the portable device transmits a digital key comprising biometric data detected by the biometric sensor and a digital identifier from the portable device to the access controller via the BAN network. The user is authenticated by the access controller using the digital key. The access controller controls and actuator to lock or unlock a door in response to the user being authenticated.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services.

As may be used herein and in the claims, the following non-exclusive definitions are provided.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A portable device for an access control system, the portable device comprising:
   a biometric sensor configured to detect biometric signals;
   a memory configured to store a digital identifier;
   a body area network, BAN, transceiver;
   a control unit coupled to the memory, the biometric sensor and the BAN transceiver; wherein the control unit is configured to:
      receive a request signal from an access controller via the BAN transceiver in response to a body area network, BAN, of a user of the portable device being formed between the portable device and the access controller;
      transmit a digital key via the BAN transceiver to the access controller, the digital key comprising a biometric signature of the user determined from the biometric sensor and the digital identifier; and the access controller being configured to authenticate a user access from the digital key and to control an actuator to lock or unlock a door;
   wherein the control unit is configured to transmit a digital key by packetizing the biometric signature data and the digital identifier;
   wherein the portable device further comprises an RF transceiver coupled to the control unit, and a power management module coupled to the RF transceiver, wherein the power management module is configured to trigger a transition from a first operating mode to a second operating mode in response to an RF signal transmitted from the access controller being detected and determining that the portable device is within a predetermined range of the access controller, wherein the portable device has a lower power consumption in the first operating mode than the second operating mode.

2. The portable device of claim 1 wherein the digital identifier is a vehicle identifier.

3. The portable device of claim 1 wherein the BAN transceiver is configured as a near field electromagnetic induction (NFEMI) transceiver.

4. A portable device for an access control system, the portable device comprising:
   a biometric sensor configured to detect biometric signals;
   a memory configured to store a digital identifier;
   a body area network, BAN, transceiver;
   a control unit coupled to the memory, the biometric sensor and the BAN transceiver; wherein the control unit is configured to:
      receive a request signal from an access controller via the BAN transceiver in response to a body area network, BAN, of a user of the portable device being formed between the portable device and the access controller;
      transmit a digital key via the BAN transceiver to the access controller, the digital key comprising a biometric signature of the user determined from the biometric sensor and the digital identifier; and the access controller being configured to authenticate a user access from the digital key and to control an actuator to lock or unlock a door;
   wherein the control unit is configured to transmit a digital key by packetizing the biometric signature data and the digital identifier;
   wherein the portable device further comprises a power management module coupled to the BAN transceiver, wherein the power management module is configured to trigger a transition from a first operating mode to a second operating mode in response to receiving the request signal and trigger a transition from the second operating mode to the first operating mode after a predetermined time period, wherein the portable device has a lower power consumption in the first operating mode than the second operating mode.

5. The portable device of claim 4 further comprising an RF transceiver coupled to the control unit, and a power management module coupled to the RF transceiver, wherein the power management module is configured to trigger a transition from the first operating mode to the second operating mode in response to an RF signal transmitted from the access controller being detected and determining that the portable device is within a predetermined range of the access controller.

6. The portable device of claim 4 wherein the BAN transceiver is configured as a near field electromagnetic induction (NFEMI) transceiver.

7. The portable device of claim 4 wherein the digital identifier is a vehicle identifier.

8. A portable device for an access control system, the portable device comprising:
   a biometric sensor configured to detect biometric signals;
   a memory configured to store a digital identifier;
   a body area network, BAN, transceiver;
   a control unit coupled to the memory, the biometric sensor and the BAN transceiver; wherein the control unit is configured to:
      receive a request signal from an access controller via the BAN transceiver in response to a body area network, BAN, of a user of the portable device being formed between the portable device and the access controller;
      transmit a digital key via the BAN transceiver to the access controller, the digital key comprising a biometric signature of the user determined from the biometric sensor and the digital identifier; and the access controller being configured to authenticate a user access from the digital key and to control an actuator to lock or unlock a door;
   a power management module coupled to the BAN transceiver, wherein the power management module is configured to trigger a transition from a first operating mode to a second operating mode in response to receiving the request signal and trigger a transition from the second operating mode to the first operating mode after a predetermined time period, wherein the portable device has a lower power consumption in the first operating mode than the second operating mode;

wherein the portable device further comprises an RF transceiver coupled to the control unit, and a power management module coupled to the RF transceiver, wherein the power management module is configured to trigger a transition from the first operating mode to the second operating mode in response to an RF signal transmitted from the access controller being detected and determining that the portable device is within a predetermined range of the access controller.

9. The portable device of claim 8 wherein the BAN transceiver is configured as a near field electromagnetic induction (NFEMI) transceiver.

10. The portable device of claim 8 wherein the digital identifier is a vehicle identifier.

* * * * *